S. W. Stockton,
Making Teeth.
No. 62,296.     Patented Feb. 19, 1867.
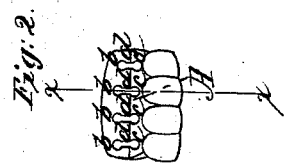
Witnesses:
Benj. Monson
Wm. H. Monson
Inventor:
S. W. Stockton

United States Patent Office.

SAMUEL W. STOCKTON, OF PHILADELPHIA, PENNSYLVANIA.

Letters Patent No. 62,296, dated February 19, 1867.

IMPROVEMENT IN ARTIFICIAL TEETH.

The Schedule referred to in these Letters Patent and making part of the same.

TO ALL WHOM IT MAY CONCERN:

Be it known that I, SAMUEL W. STOCKTON, of the city of Philadelphia, in the State of Pennsylvania, have invented a new and useful Improvement in Artificial Teeth; and I do hereby declare that the following is a full, clear, and exact description of the construction of the same, reference being had to the accompanying drawings, making a part of this specification, in which—

Figure 1 represents the inner or rear side of a single tooth.

Figure 2, a like representation of a block or series of teeth, having my said improvement applied thereto; and Figure 3, a vertical transverse section of fig. 2 on the dotted line $x$ of the latter—

Like letters of reference indicating the same parts when in the different figures.

The object of my invention is the production of a cavity or cavities in the inner or rear side of the body of a porcelain tooth, or block of teeth, for the reception of the vulcanite of the base to which such teeth are applied, which will afford a more reliable and effective means of fastening the one to the other.

It consists of a longitudinal cylindrical hole and a transverse cylindrical hole intersecting each other at nearly a right angle within the upper portion or body of the tooth, together with a slot narrower than the diameter of either of the said holes, and opening the included sides of the latter to the exterior, as hereinafter set forth and described.

In the drawings, A is the body, $b$ the longitudinal hole, $c$ the transverse hole, and $d$ the opening slot between them. The two holes $b$ and $c$ meet within the body A, (see fig. 3,) and the slot $d$ forms an open communication between them along their whole lengths. The slot $d$ is narrower than the respective diameters of the holes $b$ $c$, and consequently leaves a projection along on each side between the slot and the holes, as seen in figs. 1 and 2. It will therefore be seen that when the said holes and slot are filled with the vulcanite of the base to which the tooth or block of teeth are to be applied, and the vulcanite then hardened by heat and pressure in the usual well-known manner, the said tooth or block of teeth will be firmly held to the base by a vulcanite tenon which fills the entire cavity of each tooth, and, therefore, cannot be withdrawn. The holes $b$ and $c$ are readily and quickly made by means of a globular-headed drill, and the slot $d$ by means of a fine saw or file, whilst the body A is in the dried state which precedes the baking process; and the inner ends of the said holes may be also readily enlarged by the said drill, if so desired.

I do not desire to claim, broadly, a cavity in the body of a tooth for the reception of a vulcanite as a fastening for the same; but, having fully described the peculiarity of my improvement in artificial teeth, what I claim as new therein of my invention, and desire to secure by Letters Patent, is—

The two holes $b$ and $c$, in combination with the slot $d$; the same being constructed in the body A of a porcelain or artificial tooth or block of teeth, substantially as and for the purpose set forth and described.

S. W. STOCKTON.

Witnesses:
BENJ. MORISON,
WM. H. MORISON.